United States Patent [19]

Chu et al.

[11] Patent Number: 5,649,151

[45] Date of Patent: *Jul. 15, 1997

[54] EFFICIENT METHOD AND APPARATUS FOR ACCESS AND STORAGE OF COMPRESSED DATA

[75] Inventors: Ke-Chiang Chu, Saratoga; Calvin K. Y. Lum, Sunnyvale, both of Calif.

[73] Assignee: Apple Computer, Inc., Cupertino, Calif.

[*] Notice: The term of this patent shall not extend beyond the expiration date of Pat. No. 5,305,295.

[21] Appl. No.: 451,618

[22] Filed: May 26, 1995

Related U.S. Application Data

[63] Continuation of Ser. No. 905,984, Jun. 29, 1992, abandoned.

[51] Int. Cl.$^6$ .................................................. G06F 12/08
[52] U.S. Cl. ..................... 395/438; 395/404; 395/406; 395/413; 369/30; 369/32; 341/55
[58] Field of Search ................................. 395/406, 492, 395/412, 413, 416

[56] References Cited

U.S. PATENT DOCUMENTS

| | | | |
|---|---|---|---|
| 4,467,421 | 8/1984 | White | 364/200 |
| 4,520,506 | 5/1985 | Chan et al. | 382/56 |
| 4,782,325 | 11/1988 | Jeppsson et al. | 341/55 |
| 4,843,389 | 6/1989 | Lisle et al. | 364/DIG. 1 |
| 4,930,142 | 5/1990 | Whiting et al. | 375/120 |
| 4,949,190 | 8/1990 | Thompson | 358/426 |
| 4,996,690 | 2/1991 | George et al. | 371/37.1 |
| 5,003,307 | 3/1991 | Whiting et al. | 364/200 |
| 5,016,009 | 5/1991 | Whiting et al. | 341/67 |
| 5,101,487 | 3/1992 | Zalenski | 395/425 |
| 5,126,739 | 6/1992 | Whitting et al. | 364/200 |
| 5,146,221 | 9/1992 | Whitting et al. | 364/DIG. 1 |
| 5,148,292 | 9/1992 | Kutaragi | 358/433 |
| 5,155,484 | 10/1992 | Chambers, IV | 341/55 |
| 5,159,678 | 10/1992 | Wengelski et al. | 395/425 |
| 5,237,460 | 8/1993 | Miller et al. | 360/8 |
| 5,237,675 | 8/1993 | Hannon, Jr. | 395/425 |
| 5,245,614 | 9/1993 | Gutman et al. | 370/118 |
| 5,261,049 | 11/1993 | Lumelsky et al. | 395/164 |
| 5,278,970 | 1/1994 | Pence | 395/425 |
| 5,280,600 | 1/1994 | Van Maren et al. | 395/425 |
| 5,281,967 | 1/1994 | Jung | 341/55 |
| 5,305,295 | 4/1994 | Chu | 369/30 |

OTHER PUBLICATIONS

"Database Design" by Gio Wiederhold, Sep. 16, 1986, pp. 86-110.

"Data Compression with Huffman Coding: An Efficient Dynamic Implementation Using File Partitioning", by Saeed et al., 1990, IEEE, pp. 348-354.

*Primary Examiner*—Reba I. Elmore
*Attorney, Agent, or Firm*—V. Randall Gard

[57] ABSTRACT

Storage and access of compressed data via separately compressed and stored fixed size logical blocks. An original uncompressed data file is divided into fixed-size logical blocks and then separately compressed thus resulting in a compressed block of data of a generally known maximum size according to a compression ratio known in advance of the actual compression. After the uncompressed fixed-size logical block has been compressed into a maximum fixed-size logical block it is stored into space allocated to it. Furthermore, a table is built correlating the original uncompressed fixed-size logical block to the sectors allocated for each maximum fixed-size compressed logical block thus providing a mapping between the original uncompressed data file and the physical location on the storage device. Alternatively, because the compression ratio is known and because the size of the uncompressed fixed-size logical blocks is known, the resulting maximum size of the compressed logical blocks is generally known. Therefore, the maximum number of sectors allocated to each logical block is known and can thus provide the necessary mapping between uncompressed logical blocks and compressed data stored in sectors of a magnetic disk.

21 Claims, 8 Drawing Sheets

EFFICIENT METHOD AND APPARATUS FOR ACCESS AND STORAGE OF COMPRESSED DATA

This is a continuation of application Ser. No. 07/905,984; filed Jun. 29, 1992, abandoned.

This patent application relates to copending patent applications having the following patent application serial numbers and filing dates: Ser. No. 07/906,051, filed Jun. 29, 1992; Ser. No. 07/905,558, filed Jun. 29, 1992; and 5,305,5 Ser. No. 07/905,712, filed Jun. 29, 1992. This patent application and these copending patent applications are commonly owned at the time of filing of this patent application.

FIELD OF THE INVENTION

The present invention relates to the field of computers and electronic devices. More specifically, the present invention relates to the way compressed data is stored and accessed.

BACKGROUND OF THE INVENTION

Data for multimedia applications is generally less sequential than data of a typical data file which tends to follow a straight-line sequence from one portion or block of data in the data file to the next successive (immediately following or contiguous) portion or block of data in the data file. Instead, multimedia data, in particular, must be capable of fast direct access to any portion of a data file in response to the demands of the multimedia device, system, or user, regardless of the size of the data file.

Direct or random data access is a concept which allows a system or user to directly access a given portion of a data file based upon the known structure and size of the data file and upon the addressability of certain storage media such as system memory or magnetic disk without having to access and read the entire data file. It is for this reason that magnetic discs are often referred to as Direct Access Storage Devices (DASD) and some memory devices are referred to as Random Access Memory (RAM).

The typical storage sequence of the prior art when storing data to a magnetic disk first divides a data file into logical blocks which match the block size of the storage medium used. Then, sectors are allocated as needed by the number of logical blocks obtained. Next, the logical blocks are stored into the allocated sectors and a "mapping" is maintained correlating the logical blocks to the physical sectors. Then, when one desires to do a read of the stored data, one need merely determine which logical block contains the desired data and access the appropriate sector.

The overwhelming trend, particularly with multimedia data which oftentimes combines sound and images, is an ever increasing size of modern data files. Thus, compression of data files is becoming increasingly important.

It is typical in the art to compress an entire data file as a single unit. Then, as in the prior art method of storing uncompressed data files, one would divide the compressed data file into logical blocks. Then, sectors would be allocated as needed and the logical blocks of compressed data file would be stored into the allocated sectors.

Unfortunately, it is inefficient to read a compressed data file stored according to the known methodologies. Once a data file has been compressed and stored as a single unit then the random access capability can become lost. This is because the known structure and size of the data file has been altered by the compression process. Because one doesn't know which portion of the original uncompressed data file correlates to any portion of the stored compressed data file (since no "mapping" between uncompressed and compressed files), one must retrieve and decompress the entire compressed file in order to access even a small portion of the file. Then, in order to return the compressed data file to storage, one must re-compress the entire data file and store it via the process above.

Conversely, the present invention provides for efficient allocation of, and access to, stored compressed data files.

SUMMARY AND OBJECTS OF THE INVENTION

An objective of the present invention is to provide an improved method for storing and accessing compressed data.

A further objective of the present invention is to provide an improved apparatus for storing and accessing compressed data.

The foregoing and other advantages are provided by a method of data storage and access in a storage medium divisible into separately addressable segments, said data storage and access method comprising dividing said uncompressed data file into logical blocks of a predetermined size, obtaining a compression ratio of said uncompressed data file, allocating as many said storage medium segments as indicated by said compression ratio and said storage medium segment size; compressing each said logical block of said data file, storing each said compressed logical block of said data file into said allocated storage medium segments, and mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

The foregoing and other advantages are also provided by an apparatus for data storage and access in a storage medium divisible into separately addressable segments, said data storage and access apparatus comprising means for dividing said uncompressed data file into logical blocks of a predetermined size, means for obtaining a compression ratio of said uncompressed data file, means for allocating as many said storage medium segments as indicated by said compression ratio and said storage medium segment size, means for compressing each said logical block of said data file, means for storing each said compressed logical block of said data file into said allocated storage medium segments, and means for mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 2:
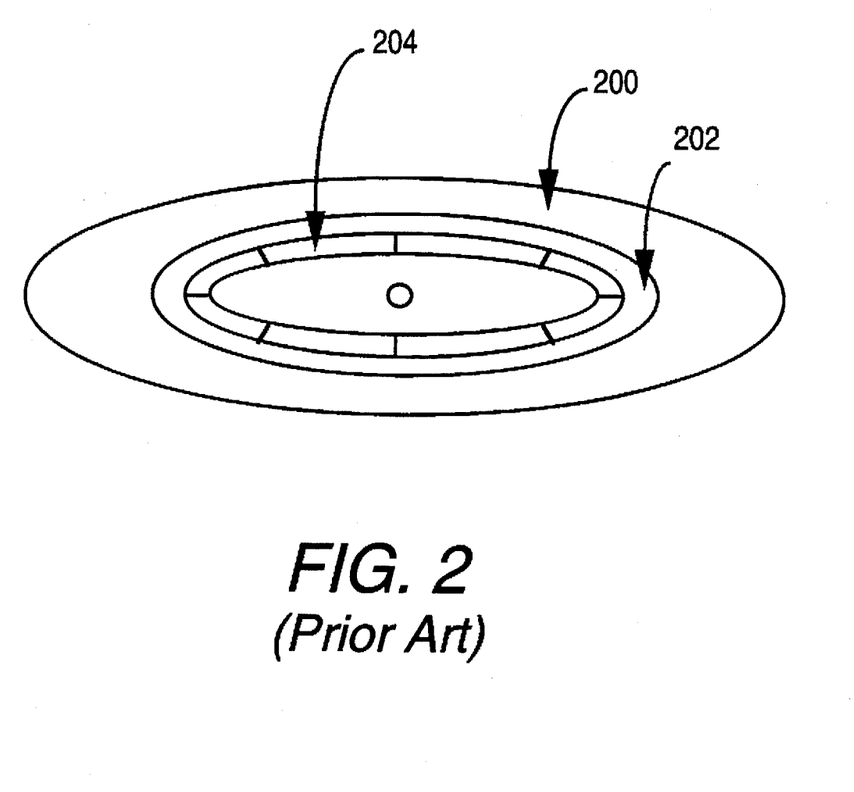
FIG. 2 depicts a typical storage medium, magnetic disk media (also commonly known as a direct access storage device), of the prior art.

Referring now to FIG. 2, magnetic disk media, a typical storage medium well known in the art, is shown. Magnetic disk media is usually formed onto a disk known as a platter 200. Disk platter 200 is generally formatted into multiple concentric rings known as tracks 202. Tracks 202 are generally formatted into multiple segments known as sectors 204. As is well known in the art, data stored onto magnetic disk media is thus directly accessible by addressing the track and sector location (and platter number if there are multiple platters) for that data. This magnetic disk addressability thus provides a logical-to-physical mapping in that a logical block or portion of data within a given file stored on disk media has an address corresponding to its physical location on the disk.

When data files are to be stored on magnetic disk media, as was explained above, it is common to break the data file down into smaller logical blocks in order to fit the data file onto the sectors of the disk media for storage. For example, a data file could be divided into logical blocks of 512 bytes each to match sectors of that size. For example, referring now to FIG. 3, if a given data file contained multiple 128 byte records and was stored on magnetic media having 512 byte sectors then the data file would be broken down into 512 byte logical blocks of four 128 byte records each. Then, space for each 512 byte logical block would be obtained by allocating one sector of the disk for each logical block. Thus each allocated sector could contain four records and is shown in the figure as four 512 byte sectors denoted 302 (containing records 1–4), 304 (containing records 5–8), 306 (containing records 9–12), and 308 (containing records 13–16).

Figure 3:
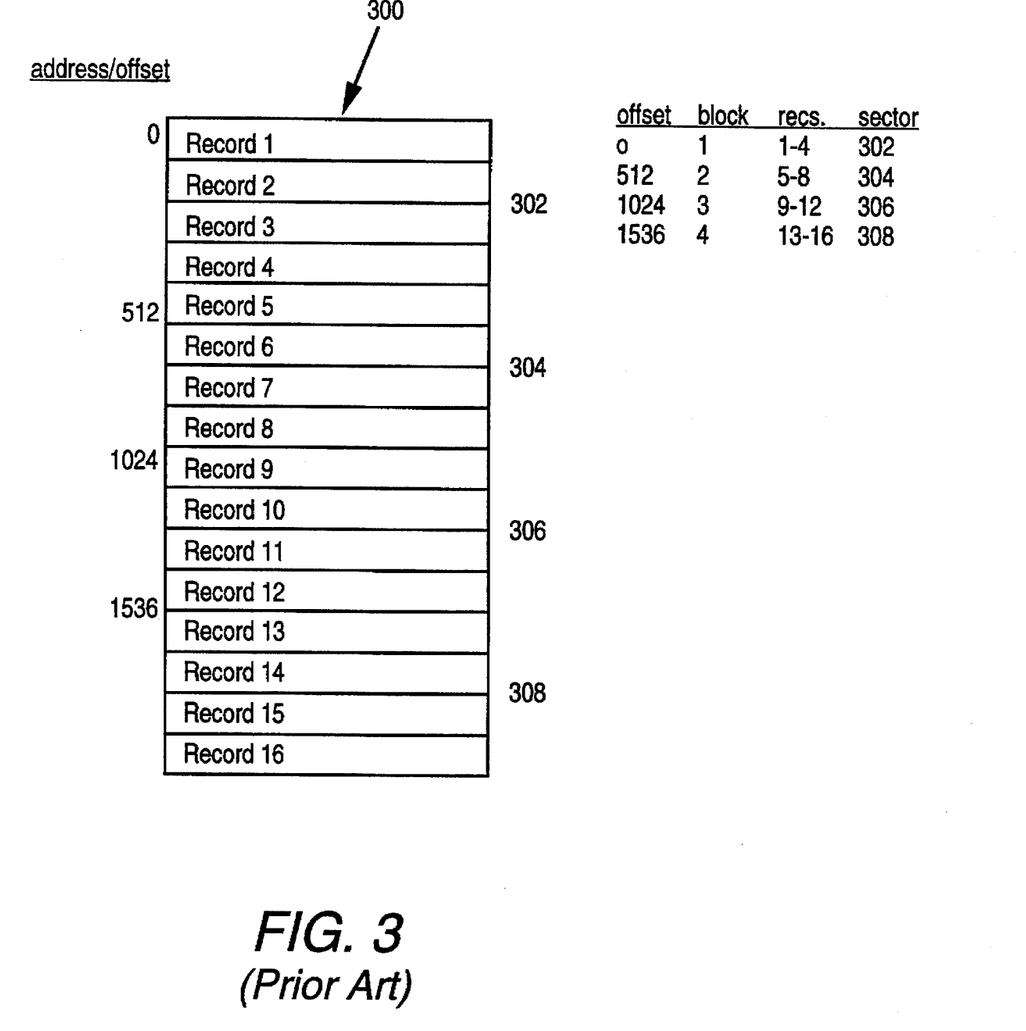
FIG. 3 depicts a typical uncompressed data storage approach of the prior art.

Furthermore, to support direct access to the logical blocks of the data file stored on the magnetic disk, a table could be generated as the logical blocks are stored into the allocated sectors. The table would show the correlation or mapping between the logical blocks (and/or which record(s) each logical block contains) and the allocated sectors. This table could later be used as a simple look-up function to translate between the logical structure of the records of the data file and the physical location where the data was stored on the magnetic disk media.

Alternatively, the record size versus the sector size could be used as a translation function between the records of the data file and the physical location where the data was stored on the magnetic disk media. The translation function could be as simple as an offset value (from the beginning of the data file to the desired record) correlated to the sector which contains the data coinciding with that offset. This translation function could be implemented as either a look-up table function or as a calculable value.

Then, when it was desired to read a given record stored on magnetic disk media, one would first determine which logical block and/or sector contained the desired record and retrieve that block or record. One approach would be to use the look-up table while an alternative approach would be to utilize the translation function. For instance if it was desired to read record 10, then the sector containing the third logical block, sector 304, could be directly accessed and only the four records (records 9–12) stored in that sector would need to be retrieved in order to locate the desired record. Furthermore, if it was known that each record contained 128 bytes and each sector held 512 bytes and that the desired record was the second record stored in the read sector then once the addressed sector were read into system memory it would be a simple matter of skipping over the first 128 bytes of the retrieved sector in order to reach the desired record. Again, this shows the direct or random access capability of data stored on magnetic disk media.

Figure 1:
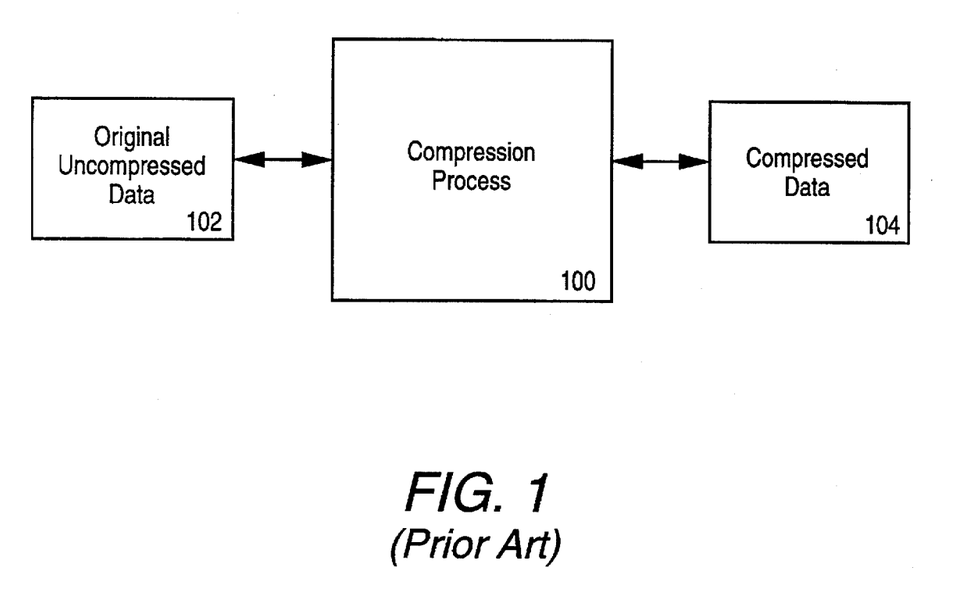
FIG. 1 depicts a typical compression sequence of the prior art.

Referring now to FIG. 1, a typical compression sequence will be explained. In a typical compression sequence of the prior art, an entire original uncompressed data file 102 passes through a compression process 100. Compression process 100 compresses the original uncompressed data 102 as a single unit or entity resulting in a unified compressed data file 104. Note that decompression is merely the reverse operation where compressed data file 104 becomes uncompressed data file 102. Compressed data file 104 is generally smaller than uncompressed data file 102 due to compression process 100 (although some data does not lend itself well to compression processes and actually result in larger data files when compressed). The relative size of original uncompressed data 102 versus compressed data 104 is known in the art as a compression ratio.

It is common in the art to store a compressed data file according to the following methodology. First, the compressed data file (again, compressed as a single entity) is divided into logical blocks of a size which matches the sector size of the particular disk/storage medium being used. Then, storage space is obtained for the logical blocks by allocating the necessary number of sectors. Finally, the compressed logical blocks of the data file are stored into the allocated sectors while building or maintaining a table or translation mapping between the data file and the allocated sectors.

Figure 4:
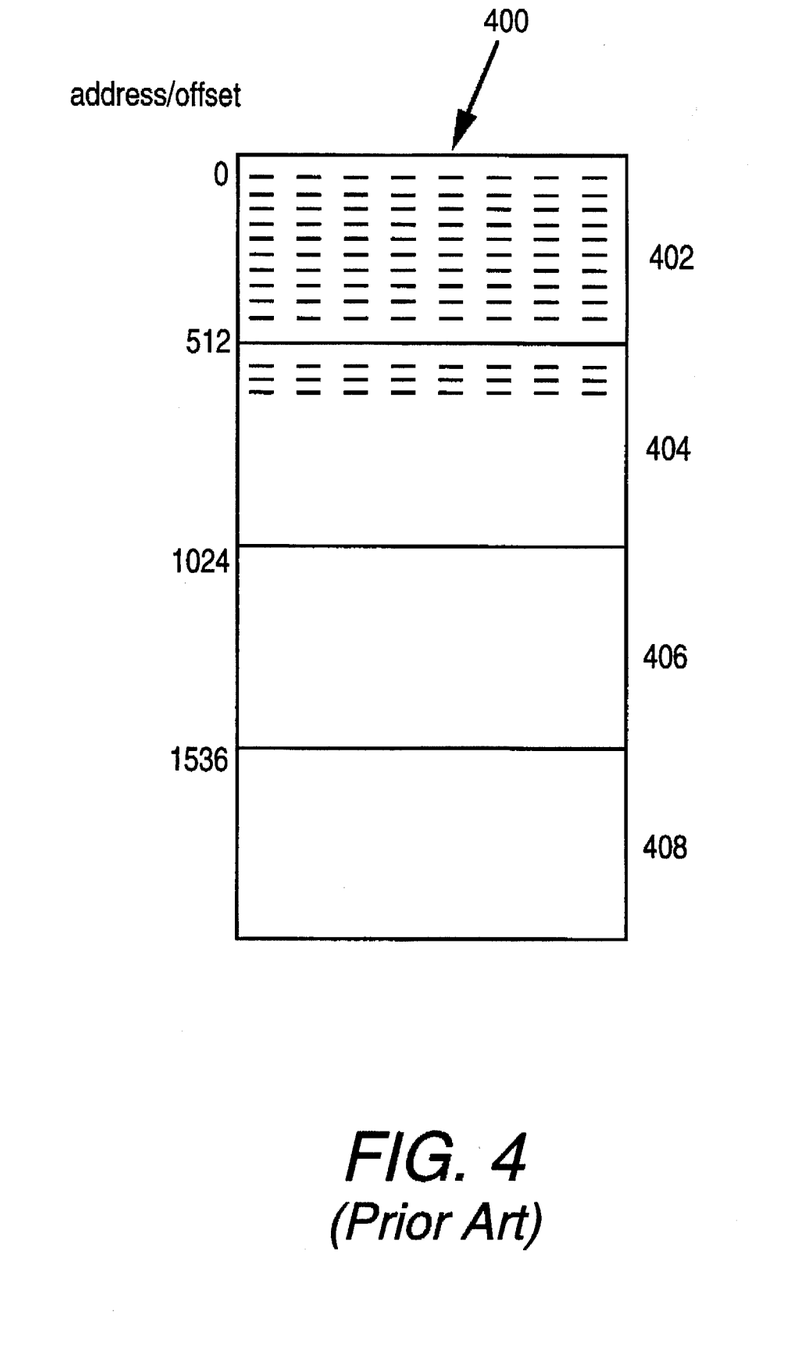
FIG. 4 depicts a typical compressed data storage approach of the prior art.

For example, if an original uncompressed data file containing multiple 128 byte records (as was shown in FIG. 3) were compressed and ready to be stored, and if the particular magnetic disk used for storage had sectors of 512 bytes, then the compressed data file would be divided into 512 byte logical blocks. Thus the compressed data file would be stored on the magnetic disk such that, referring now to FIG. 4, the first logical block would contain 12 records and would be stored in sector 402 while the second 512 byte logical block would contain the remaining 4 records (and any further records which had compressed into the second 512 byte logical block of the compressed data file) and would be stored in sector 404. Note that, as is well known in the art, the allocated sectors 402 and 404 need not be contiguous on the disk media. This thus shows the typical compression and disk storage scheme of the prior art.

Note, however that the direct access capability of the original uncompressed data file appears to be lost with the prior art compression and storage methodology. Remember that it was a relatively simple matter to determine which sector contained any given record within the original uncompressed data file (see the discussion above with reference to FIG. 3). However, that is not the case now that the original dater file has been compressed (referring again to FIG. 4) because there is no direct access to any known portion of the data file. It is possible, of course, to directly access any given sector. However, because the entire data file was compressed as a single unit, there is no simple way to know where within the compressed data file the desired portion resides. If one now wishes to access record 10, for example, one doesn't know which sector of the stored compressed data file would contain that record. Therefore, the entire compressed data file must be retrieved by retrieving all the allocated sectors containing any portion of the compressed data file. Therefore, with compressed data files of the prior art the random access capability of data is lost which means that direct access can only occur at the file level and not at the record level.

Furthermore, once one has retrieved the entire compressed data file one still don't know where the desired portion resides within the compressed data file. Therefore, one must decompress the entire retrieved compressed data file in order to locate and read just the desired portion. Still further, retrieving and decompressing the entire data file may be impractical with large data files which may exceed the size of available system memory and which may take an unreasonable amount of processor time to decompress. Finally, one must re-compress the entire data file before the data file can be stored back to disk memory. Of course, re-compressing the entire data file takes more processor time than merely re-compressing the desired portion. And writing the entire re-compressed data file back to disk memory takes more processor, input/output bus and disk time than merely writing the desired portion back to disk memory.

However, with the system of the present invention fast random access of compressed data is still possible, as will now be explained.

It is difficult to know in advance exactly how much uncompressed data will compress and therefore it is difficult to know in advance how much smaller compressed data will be than uncompressed data. However, data of the same type and structure tends to compress to the same relative size. As such, the general size of compressed data can be fairly well predicted once data of a similar type or structure has been tested and analyzed for compressibility. Therefore, when an original data file is to be compressed, it is generally known or it can be determined what amount of space should be allocated to contain the compressed data file.

In the compression and storage system of the present invention, the original uncompressed data file is divided into fixed-size logical blocks (2K to 4K bytes in the preferred embodiment of the present invention—in order to achieve good compression characteristics) before compression begins. Each fixed-size logical block is then separately compressed thus resulting in a compressed block of data which would vary in size according to the particular compression characteristics of the data in that particular block.

However, by knowing in advance what the compression ratio is for the data file the resulting compressed logical block will generally be of a known maximum size. Thus each fixed-size logical block should compress into a maximum fixed-size logical block. Knowing the compression ratio in advance of the actual compression also tells how much storage space should be allocated for each logical block before it is compressed. This space allocation could thus occur before, during, or after each fixed-size logical block is divided out and separately compressed. Thus, knowing the compression ratio indicates the expected maximum size of the resulting compressed logical block and therefore how much storage space should be allocated. After the uncompressed fixed-size logical block has been compressed into a maximum fixed-size logical block it is stored into the space allocated to it.

Correlating the original uncompressed fixed-size logical block to the sectors allocated for each maximum fixed-size compressed logical block provides a mapping between the original uncompressed data file and the physical location on the storage device. Because the compression ratio is known and because the size of the uncompressed fixed-size logical blocks is known, the resulting maximum size of the compressed logical blocks is generally known. Therefore, the maximum number of sectors allocated to each logical block is known and can thus provide the necessary mapping between uncompressed logical blocks and compressed data stored in sectors of a magnetic disk. This correlation for mapping is explained further below.

Figure 8:
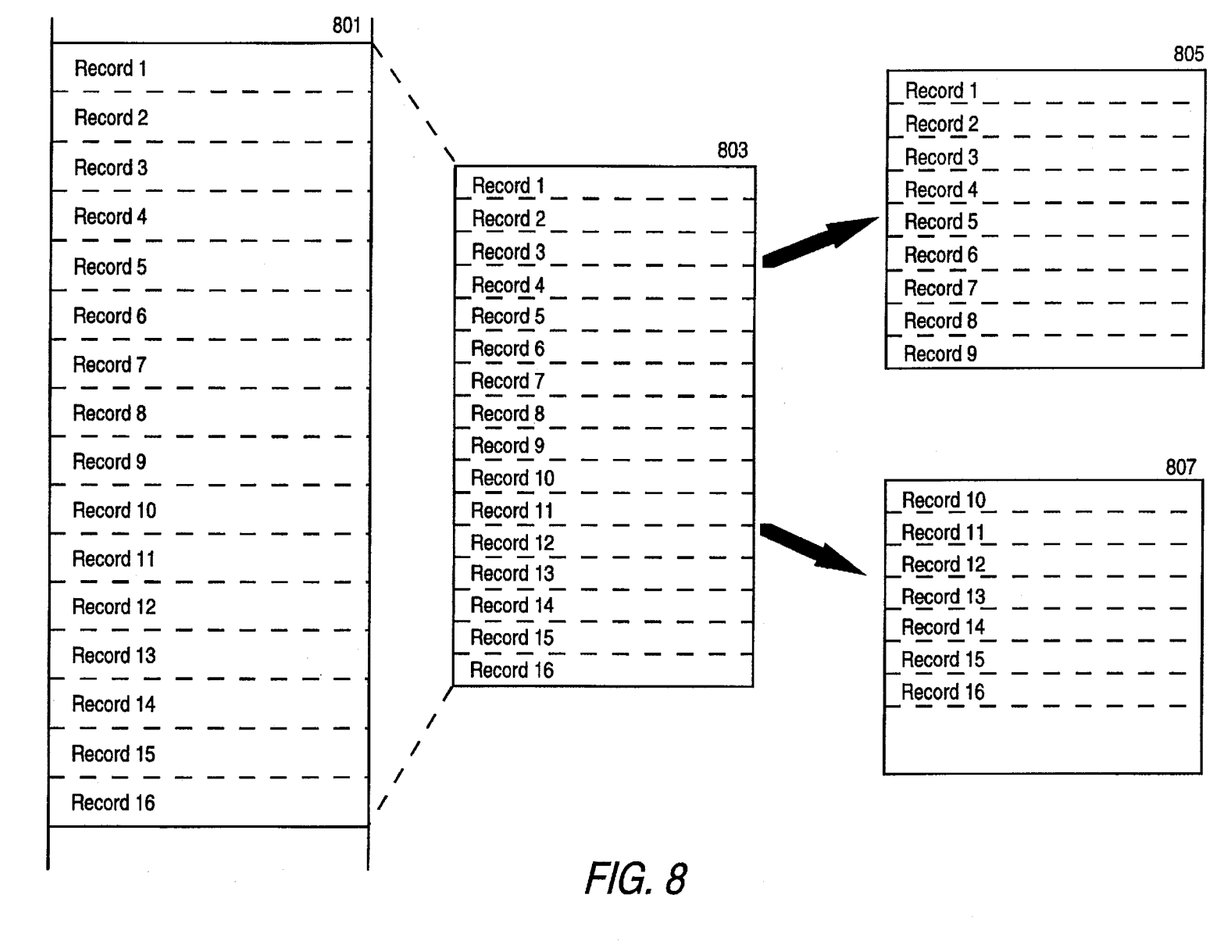
FIG. 8 depicts the compressed data storage approach of the present invention.

With reference to FIG. 8, the compression and storage of the present invention will now be explained in more detail. In this example, an uncompressed data file containing multiple 128 byte records (where only records 1–16 are shown in the figure) is divided into fixed-size logical blocks of 2K bytes each (again, to ensure good compression, as was stated above). In this example, the 2K byte uncompressed logical block 801 contains records 1–16 each comprising 128 bytes. Compressing the 2K byte logical block 801 (containing records 1–16) results in a compressed logical block 803. With a projected compression ratio of 2:1, for example, uncompressed 2K byte logical block 801 should compress down to a 1K byte compressed logical block 803. Compressed logical block 803 is then stored into two 512 byte sectors 805 and 807 of a magnetic disk.

In this example, original uncompressed logical block 801 correlates to one of two physical sectors 805 and 807 and would thus support a direct access capability within a range of two sectors. This correlation can be maintained either through the use of a table built as the logical blocks are compressed and stored into the sectors or through a determinative function as is explained more fully below. Furthermore, because the compressed data residing in sectors 805 and 807 originated from uncompressed logical block 801 which was compressed separately from any other logical blocks of the data file, the data retrieved from sectors 805 and 807 can be decompressed and read without having to retrieve all the other compressed blocks of the data file. Thus, both direct access to a desired portion of a compressed and stored data file and separate decompression has been maintained with the present invention.

Figure 7:
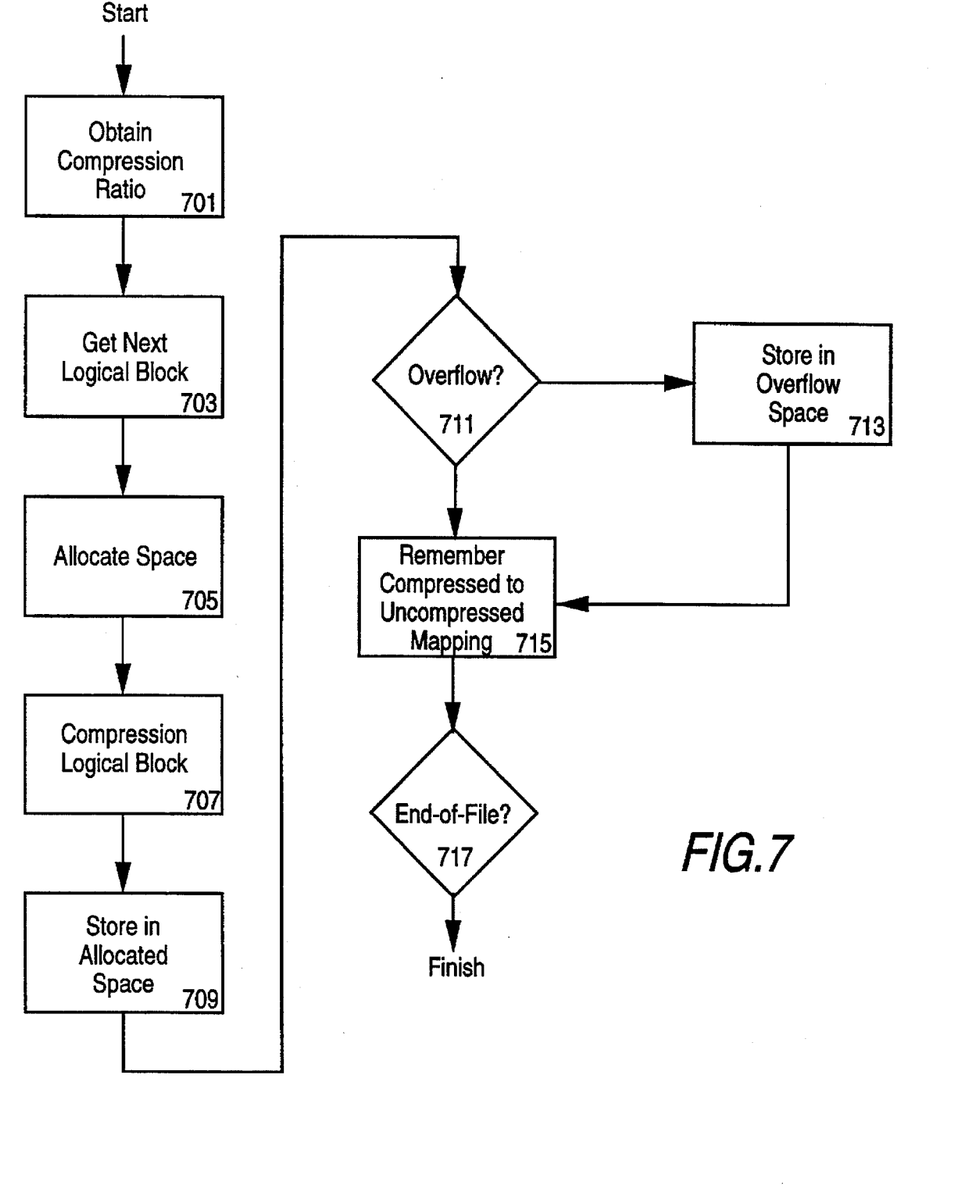
FIG. 7 is a flowchart of the compressed data storage approach of the present invention.

Referring to FIG. 7, the compression and storage system of the preferred embodiment of the present invention will be further explained. Beginning with an original uncompressed data file, the first step 701 is to obtain (read or determine as is well known in the art) the expected compression ratio. In the preferred embodiment of the present invention the first logical block of the data file is then extracted in step 703. Space is then allocated, step 705, for the logical block to be stored into when the logical block is compressed, step 707. Space allocation is determined by the logical block size, the expected compression ratio and the storage segment (e.g., sector) size of the particular storage medium (e.g., magnetic disk) being used.

In the preferred embodiment of the present invention, the logical block is stored into the allocated storage space, step 709, as it is being compressed. Of course, the expected compression ratio for a given data file may not be met in which case the compressed data would overflow the allocated space. If an overflow condition occurs, step 711, data is stored in an overflow space allocated on the storage medium, step 713, as is explained more fully below.

Either way, in the preferred embodiment of the present invention, an uncompressed-to-compressed mapping or correlation is maintained, step 715, in order to maintain the direct/random access capability explained above. This uncompressed to compressed mapping of the present invention can be provided via a table indicating which sectors contain which logical blocks and/or records.

Finally, if the end-of-file of the original uncompressed data file has been reached, step 717, then the compression and storage sequence is complete. Otherwise the process continues by getting the next logical block of the uncompressed data file, step 703, and repeating the above sequence.

To explain the uncompressed to compressed correlation of the present invention, it is easiest to begin with a simple example. Having an uncompressed data file with an expected compression ratio of 2:1, and assuming that no overflow occured, then the maximum number of sectors containing a given portion of the compressed data can be determined by knowing the relative size of the logical blocks of the uncompressed data versus the size of the sectors of the storage media (see below for more detail). Stated differently, with an expected compression ratio of 2:1 and a logical block size of 2K bytes then the logical block size should be compressable down to 1K bytes (assuming no overflow condition occurs). Then with a sector size of 512 bytes, one knows that the 1K bytes of compressed data will fit into (only consume or require) two sectors. Therefore, in this example, any given 2K logical block of uncompressed data can be associated with at most two 512 byte sectors. And, therefore, if one desired to read a given block of uncompressed data the random access capability would still be supported by merely accessing the two sectors containing the relevant compressed data.

More generally, this mapping or association can be extended to any logical block size, any compression ratio and any sector size. With the present invention, this correlation between the uncompressed logical block and the sectors containing the associated compressed data can be defined because it is known that:

logical block size/compression ratio=expected compressed block size and because it is also known that:

expected compressed block size/sector size=#sectors used and therefore it can be determined that:

logical block size/(sector size*compression ratio)= #sectors used.

Therefore, for any given logical block one can determine the maximum number of sectors it would be necessary to access in order to retrieve the entire logical block.

As another example, with a logical block size of 8K bytes, sector size of 1024 bytes and a compression ratio of 4:1, the number of sectors used to contain the compressed data would again be limited to two. However, with a logical block size of 8K bytes, sector size of 1K bytes and a compression ratio of 3:1, the number of sectors used to contain the compressed data would be limited to 2.667. Of course, one either utilizes a sector or one doesn't and therefore the range of sectors used in the latter example would be rounded to the next larger whole number, namely three. Therefore, the more complete representation of the correlation between the uncompressed data file and the compressed data file is:

(logical block size/(sector size*compression ratio)) rounded to next highest whole number=#sectors used.

This correlation can be utilized with a simple look-up table function to determine which and how many sectors to access. In other words, locating a desired portion of compressed data could be accomplished by a look-up table indicating the first sector to access while the correlation would provide the range of sectors to be accessed.

It is common in the art to retrieve and modify stored data. In the preferred embodiment of the present invention, when writing modified data back to the storage medium which contained the originally compressed block of data and the modified data does not compress to a degree such that the originally allocated space is now insufficient to contain the modified and compressed data then a modification overflow condition would occur upon writing the data back to the storage medium. When this modification overflow condition occurs the dam within the re-compressed logical block remaining to be stored essentially has no storage space left allocated for it.

The present invention approach to handling the modification overflow situation is essentially an extended implementation of the approach originally followed to compress and store the original data file. With the modification overflow condition, however, only the portions of the data file from the modified fixed size logical block to the end of the data file need to be dealt with. In other words, with the alteration overflow handling operation of the present invention (again, when a stored fixed size logical block is retrieved, decompressed and altered and will not re-compress into the space originally allocated for it) all of the compressed and stored data file from the altered fixed size logical block to the end of file will be retrieved and decompressed. Then, the same process of dividing those portions of the data file down into fixed size logical blocks which are then separately compressed into logical blocks of an expected fixed size based upon the compression ratio of the data file. Then, the compressed fixed size logical blocks are again stored into allocated sectors or blocks of the storage medium.

Thus, it has been explained that the random access capability of compressed data stored on magnetic disk media (or other direct access media) is still maintained with the system of the present invention. In other words, a desired record or portion of data would still be accessible without having to access, decompress and read the entire data file containing that record or portion. This is because a correlation or mapping between the structure of the uncompressed data file and the compressed data file has been maintained.

Of course, by definition different data files contain different data. Therefore, testing a similar data type or structure does not always adequately predict the resulting size of compressed file 104. This can be a problem when storage space is allocated for a compressed file based on an expected compression ratio which is not met. When a data file does not compress according to it's expected compression ratio, the allocated storage space can become full before the uncompressed file is completely compressed and stored. When this unmet compression type overflow situation occurs the data within the uncompressed file remaining to be compressed essentially has no storage space left allocated for it. Although it is generally preferable to be conservative when determining an expected compression ratio (so as to ensure a high probability that sufficient space is allocated thus avoiding overflow conditions), there will likely be situations where the expected compression ratio is not met by a given data file. In the present invention there are two approaches to handling this unmet compression type overflow condition.

The first approach to handling an unmet compression overflow condition will now be explained. As an example, referring now to FIG. 5, compressed records or portions 1–6 of a data file are stored in sector 502 of 512 bytes. Similarly, compressed records or portions 7–13 of the data file are stored in sector 504 of 512 bytes. Because the logical block size of the uncompressed data file was 2K bytes and because the expected compression ratio was 2:1, only 1K bytes worth of data storage sectors were allocated for this data file. However, because this data file did not compress as much as expected by the given compression ratio, there are still records or portions 14–16 of the data file remaining to be compressed and stored. This is the overflow condition referred to above.

Figure 5:
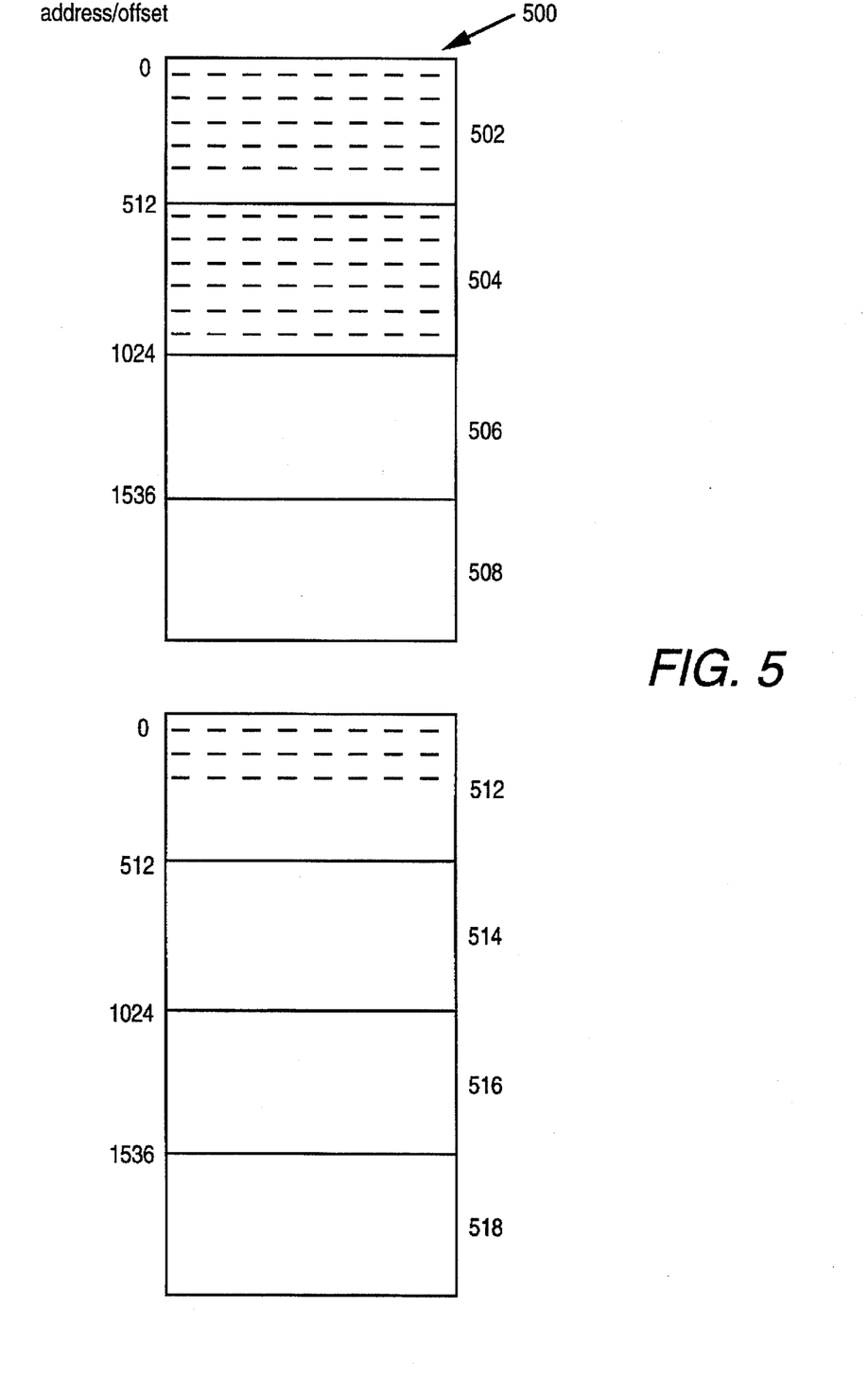
FIG. 5 depicts the first approach to handling an overflow condition of the present invention.

In that case, as was referred to in steps 711 and 713 of FIG. 7 and in accordance with the first unmet compression overflow condition approach of the present invention, these remaining records 14–16 will be compressed and stored in a separate sector 512 separately allocated for just such overflow conditions. Furthermore, an overflow indicator to the sector used by this overflow block will be set so that any references to the sectors 502 and 504 will also reference sector 512.

Figure 6:
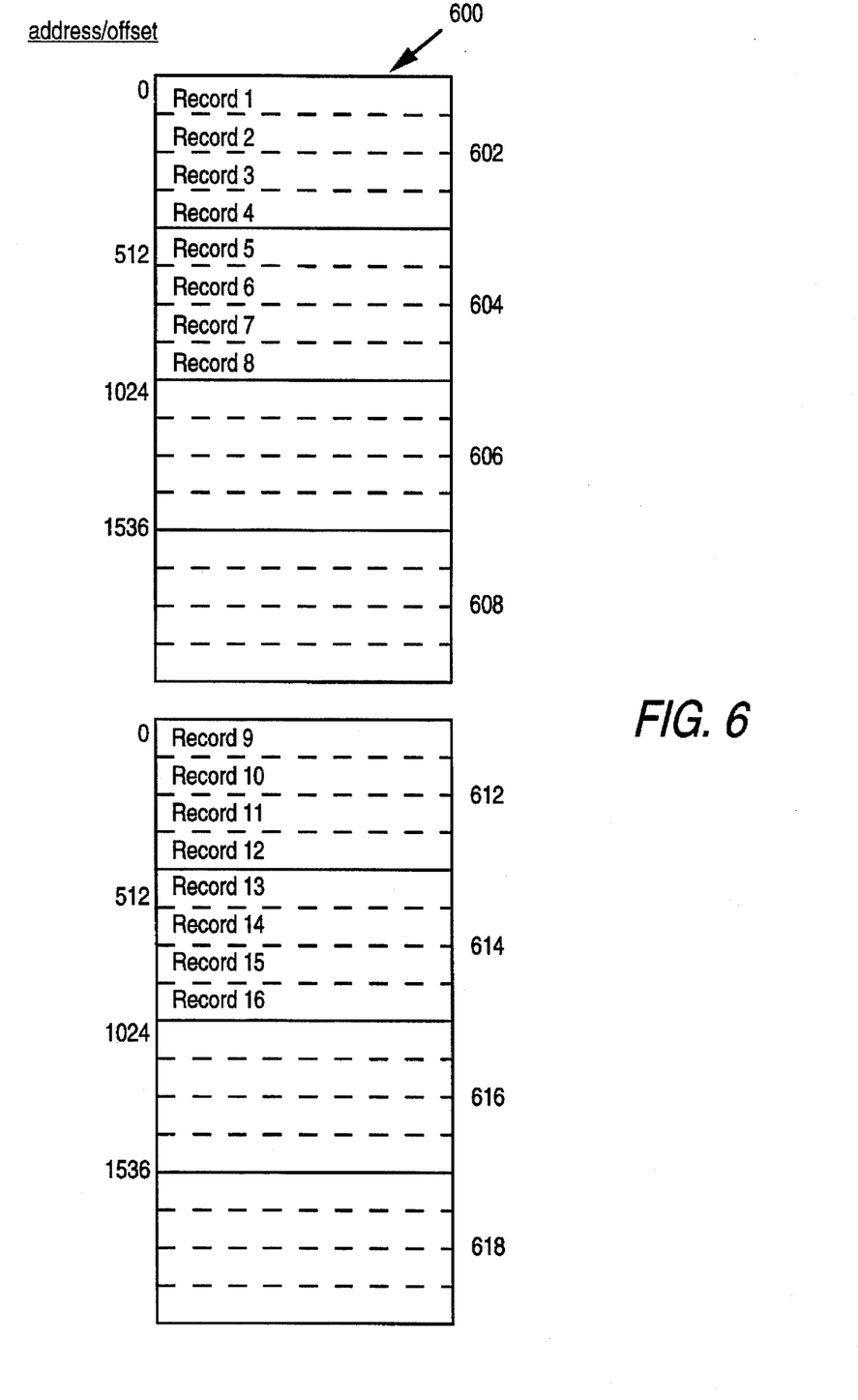
FIG. 6 depicts the second approach to handling an overflow condition of the present invention.

Referring now to FIG. 6, the second approach to handling an unmet compression overflow condition will now be explained. As an example and just as in the first approach explained with reference to FIG. 5, compressed records or portions 1–6 of a data file are stored in sector 602 of 512 bytes. Similarly, compressed records or portions 7–13 of the data file are stored in sector 604 of 512 bytes. Again, because the logical block size of the uncompressed data file was 2K is bytes and because the expected compression ratio was 2:1, only 1K bytes worth of data storage sectors were allocated for this data file. However, because this data file did not compress as much as expected by the given compression ratio, there are still records or portions 14–16 of the data file remaining to be compressed and stored. This, again, is the unmet compression overflow condition referred to above.

In that case, as was referred to in steps 711 and 713 of FIG. 7 and in accordance with the second overflow condition approach of the present invention, the records 1–13 already compressed and stored in the allocated two sectors 602 and 604 will be decompressed and however many original uncompressed records as will fit (records 1–8 in this example) will be stored in the same allocated sectors 602 and 604. Similarly, the remaining records (records 9–16 in this example), which likewise are not compressed, will be stored in as many separate sectors (sectors 612 and 614 in this example; separately allocated for just such overflow conditions) as are needed to contain the remaining records. Again, as with the first approach to an overflow condition, an overflow indicator to the sector(s) used by this overflow block will be set so that any references to the sectors 602 and 604 will also reference sectors 612 and 614.

Note that the capability and approach of the present invention apply equally well to any storage medium capable of storing data in fixed block sizes and capable of direct/random access to the address or location of the block or portion.

What is claimed is:

1. An improved method of data storage and access in a storage medium divisible into separately addressable segments, said improved data storage and access method comprising the following steps:
    a) dividing an uncompressed data file into logical blocks of a predetermined size;
    b) obtaining a compression ratio of said uncompressed data file;
    c) allocating as many said storage medium segments as indicated by said compression ratio and said storage medium segment size;
    d) compressing each said logical block of said data file;
    e) storing each said compressed logical block of said data file into said allocated storage medium segments;
    f) for each said uncompressed logical block of said data file, mapping said uncompressed logical block of said data file to said storage medium segments containing said compressed logical block of said uncompressed logical block of said data file, said mapping providing an access correlation between each said uncompressed logical block of said data file and each said storage medium segment containing said compressed logical block of each said uncompressed logical block of said data file.

2. The improved data storage and access method of claim 1 wherein the step of obtaining a compression ratio is accomplished by reading information accompanying said data file.

3. The improved data storage and access method of claim 1 wherein the step of obtaining a compression ratio is accomplished by analysis of data of a type similar to said data file.

4. The improved data storage and access method of claim 1 wherein the step of allocating said storage medium segments as indicated by said compression ratio and said storage medium is accomplished in accordance with the following relationship: (said logical block predetermined size/(said storage medium segment size*said compression ratio)) rounded to a next highest whole number.

5. The improved data storage and access method of claim 4 further including the step of allocating only as many said storage medium segments as are necessary to contain each said compressed logical block of said data file.

6. The improved data storage and access method of claim 1 wherein said mapping is done during said storage step.

7. The improved data storage and access method of claim 6 wherein said access correlation is provided via a look-up table.

8. The improved data storage and access method of claim 7 wherein said predetermined logical block size is in a range of two to four kilobytes.

9. The improved data storage and access method of claim 8 wherein said storage medium is a magnetic media direct access storage device.

10. The improved data storage and access method of claim 9 wherein said separately addressable segments are sectors of said magnetic media direct access storage device.

11. The improved data storage and access method of claim 1 further including the step of if any logical block of said data file does not compress to a degree projected by said obtained compression ratio and causes an overflow condition of said storage medium segments allocated to said logical block of said data file then:
    i) storing as much of said compressed logical block of said data file into any of said storage medium segments allocated for said compressed logical block of said data file as will fit and storing any remainder of said compressed logical block of said data file into other storage medium segments allocated for said overflow condition.

12. An improved method of access to a data file compressed and stored in a direct access storage device, said direct access storage device having separately addressable sectors, said improved data file access method comprising the following steps:
    a) dividing an uncompressed data file into logical blocks of a predetermined size;
    b) obtaining a compression ratio of said uncompressed data file;

c) allocating as many said direct access storage device sectors as indicated by said compression ratio and said direct access storage device sector size;

d) compressing each said logical block of said data file;

e) storing each said compressed logical block of said data file into said allocated direct access storage device sectors;

f) for each said uncompressed logical block of said data file, mapping said uncompressed logical block of said data file to said direct access storage device sectors containing said compressed logical block of said uncompressed logical block of said data file, said mapping providing an access correlation between each said uncompressed logical block of said data file and each said direct access storage device sector containing said compressed logical block of each said uncompressed logical block of said data file.

13. The improved data storage and access method of claim 12 wherein the step of obtaining a compression ratio is accomplished by reading information accompanying said data file.

14. The improved data storage and access method of claim 12 wherein the step of obtaining a compression ratio is accomplished by analysis of data of a type similar to said data file.

15. The improved data storage and access method of claim 12 wherein the step of allocating said direct access storage device sectors as indicated by said compression ratio and said direct access storage device sector size is accomplished in accordance with the following relationship: (said logical block predetermined size/(said direct access storage device sector size*said compression ratio)) rounded to a next highest whole number.

16. The improved data storage and access method of claim 15 further including the step of allocating only as many said direct access storage device sectors as are necessary to contain each said compressed logical block of said data file.

17. The improved data storage and access method of claim 12 wherein said mapping is done during said storage step.

18. The improved data storage and access method of claim 17 wherein said access correlation is provided via a look-up table.

19. The improved data storage and access method of claim 18 wherein said predetermined logical block size is in a range of two to four kilobytes.

20. The improved data storage and access method of claim 12 further including the step of if any logical block of said data file does not compress to a degree projected by said obtained compression ratio and causes an overflow condition of said direct access storage device sectors allocated to said logical block of said data file then:

i) storing as much of said compressed logical block of said data file into any of said direct access storage device sectors allocated for said compressed logical block of said data file as will fit and storing any remainder of said compressed logical block of said data file into other direct access storage device sectors allocated for said overflow condition.

21. An improved apparatus for data storage and access in a storage medium divisible into separately addressable segments, said improved data storage and access apparatus comprising:

a) means for dividing an uncompressed data file into logical blocks of a predetermined size;

b) means for obtaining a compression ratio of said uncompressed data file;

c) means for allocating as many said storage medium segments as indicated by said compression ratio and said storage medium segment size;

d) means for compressing each said logical block of said data file;

e) means for storing each said compressed logical block of said data file into said allocated storage medium segments;

f) for each said uncompressed logical block of said data file, means for mapping said uncompressed logical block of said data file to said storage medium segments containing said compressed logical block of said uncompressed logical block of said data file, said mapping providing an access correlation between each said uncompressed logical block of said data file and each said storage medium segment containing said compressed logical block of each said uncompressed logical block of said data file.

* * * * *